United States Patent [19]

Fischer et al.

[11] Patent Number: 4,625,008
[45] Date of Patent: Nov. 25, 1986

[54] ADHESIVES WHICH CONTAIN ACRYLIC ACID DERIVATIVES OF 5,6-DIHYDRO-DICYCLOPENTADIENOL

[75] Inventors: Wolfgang Fischer, Meerbusch; Wilfried Kniege, Bergisch-Gladbach, both of Fed. Rep. of Germany

[73] Assignee: Bayer Aktiengesellschaft, Leverkusen, Fed. Rep. of Germany

[21] Appl. No.: 842,900

[22] Filed: Mar. 24, 1986

[30] Foreign Application Priority Data

Apr. 6, 1985 [DE] Fed. Rep. of Germany ....... 3512625

[51] Int. Cl.$^4$ ............................................. C08F 20/28
[52] U.S. Cl. ..................................... 526/283; 560/185
[58] Field of Search ......................... 526/283; 560/185

[56] References Cited

U.S. PATENT DOCUMENTS 3,642,750 2/1972 Wegemund .......................... 526/283

Primary Examiner—Paul R. Michl
Attorney, Agent, or Firm—Connolly and Hutz

[57] ABSTRACT

This invention relates to adhesives which contain acrylic acid derivatives of 5,6-dihydro-dicyclopentadienol. These adhesives belong to the class of radically hardening adhesvies.

4 Claims, No Drawings

ADHESIVES WHICH CONTAIN ACRYLIC ACID DERIVATIVES OF 5,6-DIHYDRO-DICYCLOPENTADIENOL

This invention relates to adhesives which contain acrylic acid derivatives of 5,6-dihydro-dicyclopentadienol. These adhesives belong to the class of radically hardening adhesives.

Radically hardening adhesives are known to be mixtures of several materials. They consist, for example, of:

(a) monomers with a polymerisable group (reactive diluent),
(b) monomers with several polymerisable groups (cross-linking agent),
(c) polymeric constituents (thickener, elasticator),
(d) adhesion improvers and optionally further additives, for example fillers, wetting agents, stabilizers, chelate-formers etc.

There are different possibilities for hardening these mixtures, for example:

(1) As a one-component adhesive by mixing in an organic peroxide and hardening at elevated temperature.
(2) As a one-component adhesive by mixing in an organic peroxide, preferably an organic hydroperoxide and suitable accelerators. Hardening then takes place under anaerobic conditions at room temperature.
(3) As a two-component adhesive
  (A) whereby a component 1 is produced by addition of an organic peroxide and optionally of cocatalysts to a monomer-polymer mixture and the other component 2 contains as an accelerator compounds which can initiate a polymerisation with peroxides at room temperature.

The use of a 2-component adhesive can generally take place in two different manners: component 1 is mixed with component 2 and bonding takes place thereafter. Hardening to completion takes place at room temperature. It can be disadvantageous that the mixture of the two components only has a restricted pot-life.

In contrast, bonding according to the second method, the so-called no-mix method, has advantages: one component is applied on each of the parts to be bonded, only then are the parts joined. The adhesive then hardens to completion at room temperature. Moreover, it is of substantial advantage here that the joining parts previously separately treated with the adhesive components or activators can be intermediately positioned before the actual bonding.

(4) As a two-component adhesive
  (B) Component 1 can hereby be identical to the component 1 described under 3 of the formulation (A). Component 2 can be produced such that a substance is added to the monomer-polymer mixture which can initiate a polymerisation with organic peroxides at room temperature. It is also possible to combine the substance reacting with organic peroxides to form radicals and the individual constituents of the polymer-monomer mixture for the formulation of component 2, whereby the second component should be free-flowing. The processing of this 2-component reaction adhesive can take place as described under point (3).

One-component reaction adhesives, as described under (2), are predominantly used as liquid sealing materials and as a screw locking device. Two-component reaction adhesives, as described under (3) and (4), are used as construction adhesives. Those adhesives based on acrylate are known under the descriptions "second generation acrylic adhesives," SGA, "toughened acrylics", "aerobic acrylate adhesives" etc. An advantage of these adhesives is the capacity to adapt the individual components such as reactive diluent, cross-linking agent, polymer quantity and adhesion improver to the special demands of diverse bonding problems. The reactive diluent can thereby have an important task. It should render possible the combining of materials which are favourable to the demands of bonding, that is it should render possible the processing of the described constituents of an adhesive to a homogeneous, stable composition or solution. It should dilute high molecular weight ingredients of the adhesive and give the adhesive the viscosity necessary for application. In the hardening process, it should become a constituent of the hardened adhesive.

Further demands on reactive diluents are, for example, low viscosity, low steam pressure and low volatility. They should moreover increase the adhesion of the adhesive to the joining parts and reduce shrinkage during the polymerisation process as far as possible.

Mono(meth)acrylates of aliphatic $C_1$-$C_8$-alcohols are still predominantly used as a reactive diluent. These can have a high steam pressure. As a result, for example, treated joining parts which are to be bonded according to the no-mix process can be stored open only for a very short time. Moreover, the polymers of such monomers can be very soft, which can unfavourably influence the properties of the joint.

The esters of acrylic or methacrylic acid of 5,6-dihydrodicyclopentadienol are known from U.S. Pat. No. 3,642,750 for anaerobically hardening adhesive compositions or sealing compositions. These compounds have an unpleasant odour, however, and form hard, brittle and thus very fragile bonding compounds.

Anaerobically hardening adhesive compositions and sealing compositions are known from EP-A-No. 0 008 202, which contain 5,6-dihydro-dicyclopentadienol-oxyalkyl(meth)acrylates. These reactive diluents of the ester-ether type also become brittle during or after hardening when applied as an adhesive.

It has now been found that adhesives which contain acryloyl derivatives of 5,6-dihydro dicyclopentadienol, achieve the required properties without having the disadvantages of the known, very similar reactive diluents.

The invention provides one-component and two-component adhesives which contain compounds of the formula (I)

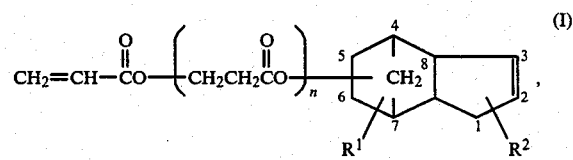

wherein $R^1$ and $R^2$ independently from each other represent a hydrogen atom, a $C_1$-$C_4$-alkyl group, preferably hydrogen or a methyl group, n represents an integer of from 1 to 5, preferably from 1 to 3, particularly the integer 1.

The binding of the ester group to the dicyclopentadienyl radical can take place in position 5 or 6.

The synthesis of the compounds of formula (I) takes place via the oligomeric acrylic acids of the formula (II)

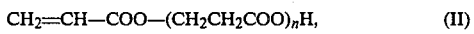

$$CH_2=CH-COO-(CH_2CH_2COO)_nH, \quad (II)$$

wherein n is represented as given in formula (I).

Oligomeric acrylic acids can be produced by heating acrylic acid in the presence of polymerisation inhibitors (for example DE-OS No. 2 800 357).

For the production of the ester (I), oligomeric acrylic acids can be added evenly to dicyclopentadienes in the presence of acidic catalysts. The molar ratio of oligomeric acrylic acid/dicyclopentadiene in the reaction mixture is from 1:1 to 3:1, preferably from 1.5:1 to 2:1. The reaction temperature is from 50° to 150° C., preferably from 60° to 80° C.

A further possibility for synthesizing the ester (I) consists in esterifying oligomeric acrylic acids with 5,6-dihydro-dicyclopentadienol of the formula (III)

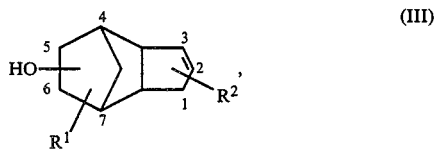

wherein $R_1$ and $R_2$ are represented as given in formula I. The alcohol (III) is produced according to known processed by acidically catalysed water addition to dicyclopentadiene. Both processes for the production of the ester (I) are described, for example, in EP-A-No. 57 834.

The adhesives according to the invention thus have the following composition:

Component 1
(a) Reactive diluent of the formula (I),
(b) cross-linking agent, compounds with several polymerisable double bonds, for example oligo(meth)acrylates,
(c) high molecular weight constituents, for example thermoplasts, elastomers,
(d) adhesion improver,
(e) one or more peroxide compounds which are capable to initiate a radical polymerisation,
(f) catalysts (accelerators),
(g) stabilizers,
(h) further additives, for example fillers, wetting agents, thixotropic auxiliaries.

Optionally a component 2

Accelerators with optionally further constituents of component 1, for example components a, b, c, d, f, g, h, individually or in mixtures, with the proviso that component 2 is liquid. Component 2 can additionally contain auxiliaries such as solvents, film formers etc.

The reactive diluent of component 1 (a) preferably corresponds to a dicyclopentadienol derivative of the formula (IV)

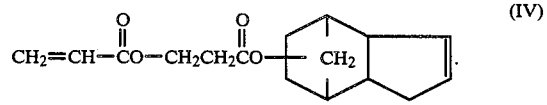

Compounds with several polymerisable groups, for example (meth)acrylates based on diols and triols, preferably tetraethoxylated trismethylolpropane-tris-(meth)acrylates, can be used as the cross-linking agent (b).

High molecular weight constituents (c) can be: poly(meth)acrylates, polychloroprene, chlorinated polyethylene, chlorosulphonated polymers, for example chlorosulphonated polyethylene, acrylonitrile butadiene rubbers, styrene butadiene rubbers, polybutadiene, ethylene vinyl acetate polymers, polyvinyl acetate, polyesters, polyethers, polyurethanes etc.

Conventional polymerisable acids such as (meth)acrylic acid, oligomeric acrylic acids, polymerisable isocyanates, silanes or phosphoric acid esters are suitable as adhesion improvers (d).

The peroxidic compound (e) can be derived from hydrocarbons (for example having from 3 to 18 carbon atoms). Commercial peroxides such as dibenzoyl peroxide, tert.-butylbenzoate etc., are suitable, for example, suitable hydroperoxides are cumene hydroperoxide, tert.-butyl hydroperoxide. The peroxidic compounds can be used alone or in combination with each other.

As the accelerator (f) are to be understood conventional compounds which can together with peroxidic compounds initiate a radical polymerisation at room temperature. Aliphatic or aromatic tert. amines such as triethylamine, dimethyl aniline etc., sulphenic amides, sulphimides such as saccharin are suitable for example.

If the peroxidic compound and the accelerator are in the same adhesive component, the oxygen supply to the adhesive component should be ensured to maintain the stability. The accelerators can be used both individually and in combination with each other.

Conventional, active oxygen-containing compounds such as hydroquinone and the derivatives thereof can be used as stabilizers (g) as well as complexing agents such as ethylene diamine tetraacetic acid (EDTA).

Further additives (h) are, for example, fillers, silicas, silicates, titanium dioxide, calcium carbonates etc and additionally for special cases wetting agents, dyes etc.

The accelerators listed under point (f) can optionally be a constituent of a second adhesive component. The following are principally suitable as an accelerator in a second component:

aliphatic-aromatic tert. amines which can be optionally substituted, for example dimethylaniline, N,N-bis-hydroxyethyl toluidines, N,N-bis hydroxypropyl toluidines etc.

reaction products of amines and aldehydes, for example reaction products of butyl amine and butyraldehyde or of butyraldehyde and aniline, for example Vulkazit 576 ® (Bayer AG). Moreover, metal siccatives, for example soluble salts of Co, Pb, Mn, Zr, Ca, Fe such as 2-ethylhexanoates or naphthenates can be used. The substances active as accelerator can be used both individually and in a mixture with each other.

Preferred adhesives according to the invention are:

1. Liquid, one-component, anaerobically hardening reactive adhesives of the following composition:
(a) reactive diluent of the formula (I),
(b) from 0 to 40% by weight of cross-linking agent,
(c) from 0 to 50% by weight of high molecular weight constituents
(d) from 0 to 20% by weight of adhesion improver,
(e) from 0.1 to 20% by weight of hydroperoxides,
(f) from 0 to 5% by weight of accelerators,
(g) from 0 to 1% of active oxygen-containing stabilizers,
(h) from 0 to 50% by weight of further additives.

The sum of the constituents listed under (c) and (h) should not exceed 50% by weight.

% by weight here relates to the quantity of reactive diluent (a) used.

To prevent premature polymerisation, it should be ensured that this mixture always contains a sufficiently high quantity of dissolved oxygen.

2. Liquid two-component reactive adhesives consisting of:

Component 1

(a) from 20 to 80 parts by weight of reactive diluent of the formula (I),
(b) from 0 to 20 parts by weight of cross-linking agent,
(c) from 0 to 70 parts by weight of high molecular weight constituents,
(d) from 0 to 50 parts by weight of adhesion improver
(e) from 0.1 to 10% by weight of peroxides,
(f) from 0 to 1% by weight of imide (coaccelerator),
(g) from 0 to 1% by weight of active oxygen-containing stabilizers,
(h) from 0 to 50 parts by weight of further additives.

Component 2:

Accelerators and optional additives.

The percentages by weight relate to the sum of the compositions a, b, c, d and h.

These adhesives can be used according to a mix or no-mix process.

If a mix-process is used, the mixture should have peroxide-accelerator ratios of from 1:10 to 99:1, particularly from 1:1 to 90:10.

The production of the adhesives according to the invention can take place in conventional kneading or stirring apparatus, optionally at elevated temperatures (max 80° C.). If an elevated temperature is worked with, air should be blown through the mixing vessel in order to prevent any possible premature polymerisation.

Peroxidic compounds should only be incorporated at room temperature.

EXAMPLE 1

This example shows the properties of adhesive films which contain the reactive diluents according to the invention compared with adhesive films which contain 5,6-dihydro dicyclopentadienyl-oxyethyl methacrylate (QM 657 Rohm und Haas Comp.).

The following mixtures were additionally produced in stirring apparatus:

(a) 147 g of esters of dimeric acrylic acid with 5,6-dicyclopentadienol
  9 g of tetraethoxylated trismethylol propane trisacrylate
  7.5 g of tert. butyl perbenzoate
  0.8 g of saccharin
(b) 190 g of acrylic esters of hydracrylic acid-5,6-dihydro-dicyclopentadienyl ester
  6.4 g of tetraethoxylated trimethylolpropane trisacrylate
  2.5 g of tert. butyl perbenzoate
  0.3 g of saccharin
(c) 147 g of 5,6-dihydro dicyclopentadienyl oxyethyl-methacrylate (QM 657 Rohm und Haas Comp.)
  9 g of tetramethoxylated trismethylolpropane trisacrylate
  7.5 g of tert. butyl perbenzoate
  0.8 g of saccharin
(d) 190 g of 5,6-dihydro dicyclopentadienyl oxyethyl-methacrylate (QM 657 Rohm und Haas Comp.)
  9 g of tetraethoxylated trismethylolpropane trisacrylate
  5 g of tert. butyl perbenzoate
  0.6 g of saccharin These mixtures were each mixed with 2% of Vulkazit 576 ® (Bayer) (butyraldehyde/aniline condensation product) and cast in PTFE moulds into 1 mm thick films. After 72 hours, the films were taken out of the mould, after a further 10 days rods were punched out corresponding to DIN 53 504 S 3, and the tensile strength and elongation at break determined:

| Film | Tensile Strength MPa | Elongation at break % |
|---|---|---|
| a | 4.8 | 74 |
| b | 2.6 | 91 |

This determination could not be undertaken with the films c and d since they were so substantially embrittled that they broke during an attempt to punch out standard rods.

EXAMPLE 2

Comparison of the reactive diluents of formula (V)

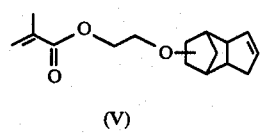

Rohm und Haas QM 657 ® (dihydro-dicyclo pentadienyl-oxyethyl methacrylate)

(V)

and

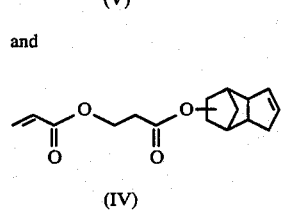

Reactive diluents of the formula IV (esters of dimeric acrylic acid with 5,6-dihydrodicyclopentadienol)

(IV)

in a two-component adhesive system.

In a stirring apparatus, a homogeneous mixture was produced with distribution of air at 70° C., consisting of:
10 g of ethylene vinyl acetate copolymer, (Levapren 450 ® Bayer)
35 g of reactive diluent
1.4 g of tetraethoxylated trismethylolpropane trisacrylate Adhesive components 1 were produced from this mixture at room temperature by addition of:
(a) 2% of benzoyl peroxide
(b) 2% of benzoyl peroxide, 9% of methacrylic acid
(c) 2% of tert. butyl perbenzoate, 0.75% of saccharin
(d) 2% of tert. butyl perbenzoate, 0.75% of saccharin, 9% of methacrylic acid Component 2

For the mixtures a and b: 3 parts of dimethylaniline 1 part of N,N-bishydroxyethyl-p-toluidine
for the mixtures c and d: Vulkazit 576 ® (Bayer AG) (butyraldehyde/aniline condensation product)

For bonding, component 1 and component 2 were each applied on a test sample. Joining then took place such that the overlapping surface was 20×10 mm. Leguval strips (GF-UP sheet moulded compounds) with the measurements 20×40×4 mm, hereafter abbreviated to SMC, were used as a test sample. This is a low profile quality with a 30% glass proportion and 4.5% of Zn-stearate as a mould release agent. Iron test samples (deep drawing sheet steel 1303) with the measurements 20×40×2 mm were used as a second test material. This material is hereafter abbreviated to iron. The iron test samples were degreased with methylene chloride before bonding.

For determining the handling strength, the time was determined from which the bonded parts could no longer be moved against each other by finger pressure from thumb and forefinger. For determining the final strength, the joined testing samples are loaded with a weight of 1 kg for 2 hours and thereafter left for 12 hours at room temperature. The ultimate tensile strength was established as the final strength according to DIN No. 53 283.

| | Handling strength: | | | |
|---|---|---|---|---|
| | Reactive diluent V | | Reactive diluent IV | |
| Adhesive | SMC | Iron | SMC | Iron |
| a | 3 min | 3 min | 4 min | 3 min |
| b | 40 sec | 40 sec | 2 min | 1 min |
| c | 15 min | 15 min | 15 min | 15 min |
| d | 10 min | 4 min | 10 min | 6 min |

| | Reactive diluent V | | Reactive diluent IV | |
|---|---|---|---|---|
| Adhesive | SMC (N/mm$^2$) | Iron (N/mm$^2$) | SMC (N/mm$^2$) | Iron (N/mm$^2$) |
| a | 1.3 | 2.6 | 2.7 | 6.8 |
| b | 1.6 | 5.5 | 2.0 | 7.4 |
| c | 0.9 | 4.8 | 4.8 | 7.5 |
| d | 0.7 | 5.9 | 4.1 | 9.2 |

The comparison shows that with unsubstantially changed setting behaviour clearly better bonding properties are obtained with the reactive diluent according to the invention.

EXAMPLE 3

With this example, the different formulation possibilities of two-component acrylate adhesives are shown.

In a stirring apparatus, a homogeneous mixture was produced with a flow through of air at 70° C., consisting of:

10 g of ethylene vinyl acetate copolymer (Bayer Levapren 700 ®)

35 g of esters of dimeric acrylic acid with 5.6-dihydro-dicyclopentadienol 1.4 g of tetraethoxylated trimethylol propane trisacrylate.

Adhesive components 1 and 2 were produced from this mixture at room temperature.

Adhesive component 1 by addition of:
(a) 2% of tert. butyl perbenzoate, 0.75% of saccharin
(b) 2% of tert. butyl perbenzoate, 0.75% of saccharin, 9% of methacrylic acid
(c) 2% of tert. butyl perbenzoate, 0.75% of saccharin, 30% of hydroxyethyl methacrylate,
(d) 2% of tert. butyl perbenzoate, 0.75% of saccharin, 30% of hydroxyethyl methacrylate,
(e) 2% of benzoyl peroxide Adhesive component 2 by addition of:
(f) 2% of Bayer Vulkazit 576 ®
(g) 4% of Bayer Vulkazit 576 ®

These components as described in Example 2 were bonded in the no mix-process as follows and tested:

| | Final strengths: | | |
|---|---|---|---|
| component 1 | component 2 | SMC (N/mm$^2$) | Iron (N/mm$^2$) |
| mixture a | Vulkazit 576 | 1.9 | 12.7 |
| mixture b | " | 1.3 | 14.1 |
| mixture c | " | 4.9 | 12.8 |
| mixture d | " | 7.1 | 13.0 |
| mixture c | mixture f | 1.0 | 10.1 |
| mixture c | mixture g | 3.0 | 12.6 |
| mixture e | 3 parts of dimethyl aniline 1 part of N,N—bishydroxyethyl-p-toluidine | 3.2 | 12.8 |

EXAMPLE 4

This example shows the compatibility of the reactive diluents according to the invention with further polymer components suitable for adhesives.

In a stirring apparatus, a homogeneous mixture is produced at room temperature consisting of:

21.6 g of acrylonitrile butadiene rubber (Bayer Perbunan N 3302NS9 ®)

75.4 g of esters of dimeric acrylic acid with 5,6-dihydro dicyclopentadienol 3 g of tetraethoxylated trismethylol propane trisacrylate Adhesive components 1 are produced from this mixture by addition of:
(a) 2% of benzoyl peroxide, 9% of methacrylic acid
(b) 2% of butyl perbenzoate, 0.75% of saccharin, 9% of methacrylic acid Component 2:
for the mixture a: 3 parts of dimethylaniline 1 part of N,N-bishydroxyethyl-p-toluidine
for the mixture b: Vulkazit 576 ® (Bayer AG) (butyraldehyde/aniline condensation product)

| | Handling strengths: | |
|---|---|---|
| | SMC min | Iron min |
| (a) | 5 | 2 |
| (b) | 10 | 10 |

| | Final strength: | |
|---|---|---|
| | SMC N/mm$^2$ | Iron N/mm$^2$ |
| (a) | 4.0 | 7.8 |
| (b) | 2.4 | 10.0 |

EXAMPLE 5

This example shows the compatibility of the reactive diluents according to the invention with further components which are suitable for adhesives.

In a kneading apparatus with σ-kneading hooks, a homogeneous mixture is produced from:

30 g of chlorosulphonated polyethylene (Hypalon 20 ® DuPont)

110 g of esters of dimeric acrylic acid with 5,6-dihydro-dicyclopentadienol 6.7 g of tetraethoxylated trimethylol propane trisacrylate Adhesive components 1 are produced from these mixtures by addition of:
(a) 2% of benzoyl peroxide
(b) 2% of benzoyl peroxide, 9% of glycidyl methacrylate, (c) 2% of benzoyl peroxide, 9% of isocyanato-ethylmethacrylate (d) 2% of tert. butyl perbenzoate, 0.75% of saccharin (e) 2% of tert. butyl perbenzoate, 0.75% of saccharin, 9% of glycidyl methacrylate (f) 2% of tert. butyl perbenzoate, 0.75% of saccharin, 9% of isocyanato-ethylmethacrylate As component 2, a mixture of 3 parts of dimethylaniline and 1 part N,N-bishydroxyethyl-p-toluidine are used for the adhesive mixtures a to c. For the adhesive mixtures d to f, Vulkazit 576®  (Bayer) (aniline-butyraldehyde condensation product) is used as component 2.

| | Handling strengths: | |
| --- | --- | --- |
| | SMC | Iron |
| (a) | 45 sec | 45 sec |
| (b) | 1 min | 1 min |
| (c) | 45 sec | 45 sec |
| (d) | 10 min | 10 min |
| (e) | 4 min | 9 min |
| (f) | 8 min | 10 min |
| | Final strengths: | |
| | SMC ($N/mm^2$) | Iron ($N/mm^2$) |
| (a) | 3.6 | 6.4 |
| (b) | 5.4 | 7.2 |
| (c) | 3.7 | 13.9 |
| (d) | 3.8 | 6.8 |
| (e) | 4.0 | 11.1 |
| (f) | 4.1 | 14.7 |

EXAMPLE 6

In a stirring apparatus, a one component-adhesive is produced with a flow through of air, consisting of:

75 g of an acrylic ester of hydracrylic acid-5,6-dihydrodicyclopentadienyl ester 2 g of cumeme hydroperoxide 0.3 g of saccharin 15 g of tetraethoxylated trismethylol propane trisacrylate 10 g of methacrylic acid M-8 brass screws and nuts were cleaned in methylene chloride. The adhesive mixture was thereafter applied on the screw thread and the nuts were screwed on. After 24-hour storage at room temperature, the torsional force which is necessary for unscrewing the bond ("untwisting moment") was determined in Nm by means of a twisting moment key, it was 15 Nm.

What is claimed is:

1. One-component and two-component adhesives which contain compounds of the formula (I)

$$CH_2=CH-\overset{O}{\underset{\|}{C}}O\left[CH_2CH_2\overset{O}{\underset{\|}{C}}O\right]_n \begin{array}{c}\text{(bicyclic structure)}\end{array} \quad (I)$$

wherein $R^1$ and $R^2$ independently from each other represent a hydrogen atom, a $C_1$–$C_4$-alkyl group, n represents an integer of from 1 to 5.

2. Liquid, one-component, anaerobically hardening reactive adhesives of the following composition:
(a) reactive diluent of the formula (I),
(b) from 0 to 40% by weight of cross-linking agent
(c) from 0 to 50% by weight of high molecular weight constituents
(d) from 0 to 20% by weight of adhesion improver,
(e) from 0.1 to 20% by weight of hydroperoxides,
(f) from 0 to 5% by weight of accelerators,
(g) from 0 to 1% of active oxygen-containing stabilizers,
(h) from 0 to 50% by weight of further additives.

3. Liquid, two-component reactive adhesives consisting of:

Component 1
(a) from 20 to 80 parts by weight of reactive diluent of the formula (I),
(b) from 0 to 20 parts by weight of cross-linking agent
(c) from 0 to 70 parts by weight of high molecular weight constituents
(d) from 0 to 50 parts by weight of adhesion improver
(e) from 0.1 to 10% by weight of peroxides
(f) from 0 to 1% by weight of imide (coaccelerator)
(g) from 0 to 1% by weight of active oxygen-containing stabilizers
(h) from 0 to 50 parts by weight of further additives, Component 2
Accelerators and optional additives.

4. Adhesive according to claim 1, characterised in that a dicyclopentadienol derivative of the formula (IV)

$$CH_2=CH-\overset{O}{\underset{\|}{C}}-CH_2CH_2\overset{O}{\underset{\|}{C}}O-\begin{array}{c}\text{(bicyclic structure with }CH_2\text{)}\end{array} \quad (IV)$$

is used as reactive diluent.

* * * * *